United States Patent [19]

Greenfeld

[11] Patent Number: 4,931,928
[45] Date of Patent: Jun. 5, 1990

[54] APPARATUS FOR ANALYZING SOURCE CODE

[76] Inventor: Norton R. Greenfeld, 6 Brook Trail Rd., Wayland, Mass. 01778

[21] Appl. No.: 269,135

[22] Filed: Nov. 9, 1988

[51] Int. Cl.$^5$ .............................................. G06F 9/44
[52] U.S. Cl. ................................................. 364/300
[58] Field of Search ........................ 364/200, 300, 900

[56] References Cited

U.S. PATENT DOCUMENTS

| | | | |
|---|---|---|---|
| 4,506,326 | 3/1985 | Shaw et al. | 364/300 |
| 4,686,623 | 8/1987 | Wallace | 364/300 |
| 4,688,195 | 8/1987 | Thompson et al. | 364/300 |
| 4,729,096 | 3/1988 | Larson | 364/300 |
| 4,751,635 | 6/1988 | Kret | 364/200 |
| 4,787,035 | 11/1988 | Bourne | 364/300 |

OTHER PUBLICATIONS

"Global Program Analysis In An Interactive Environment" by Larry M. Masinter, SSL-80-1 Xerox Palo Alto Research Center, Palo Alto, Calif., Jan. 1980, pp. 39–61 and 67–83 (Chapter 4–6 and Apendixes 1–3 respectively).
"Telescope: A Cross Reference Utility for Lisp" by Jed Krohnfeldt, Utah PASS Project Op Note 86-11, Dec. 4, 1986, pp. 1–2.
"Reverserver: Databases for Reverse Engineering" in *Release 1.0*, published by EDventure Holding, Inc., Apr. 10, 1989, pp. 12–13.

*Primary Examiner*—Raulfe B. Zache
*Attorney, Agent, or Firm*—Hamilton, Brook, Smith & Reynolds

[57] ABSTRACT

Apparatus in a computer system provides source code analysis. The apparatus includes an analysis member which extracts programming semantics information from an input source code. The analysis member operates according to the programming language of the source code as defined by a grammar mechanism. The analysis member employs a database interface which enables the extracted programming semantics information to be placed in a user desired database for subsequent recall by a desired query system. The database and query system may be pre-existing elements which are supported by a digital processor independently of the analysis member. A relational database with an SQL query system may be used.

19 Claims, 4 Drawing Sheets

APPARATUS FOR ANALYZING SOURCE CODE

BACKGROUND OF THE INVENTION

As software systems are developed and maintained there is a strong tendency to write new programs to accomplish tasks rather than re-use or modify software already existing. This makes the general complexity of software systems increase with concommitment increase in size, maintenance effort and in conceptual effort needed to understand and control future development.

These tendencies are controlled in the present art with diagrammatic methodologies for visualizing the system at a variety of conceptual levels, with design decisions that limit functionality and future expansion possibilities and with management discipline to ensure manual review of changes proposed.

Missing from the present art are tools and methods for examining existing source code to find opportunities for simplification, generalization, consolidation or any other automated or semi-automated support means for helping software designers and developers reconceptualize the code into a more coherent and manageable form. Source code therefore evolves in the direction of increasing size and complexity rather than increasing coherency and generalization. The overall costs of such trends are enormous.

Source code analysis also provides powerful tools for the system analyst working on maintaining or enhancing an existing system, as well as for quality assurance. With the proper tools the analyst can understand the implications of a change in one part of a system, in particular the change's effects on other parts. This can dramatically reduce the chances of a change to a system introducing defects in its overall functioning. Planning maintenance or enhancements becomes more reliable and accurate in the presence of an appropriate source code analysis tool.

Quality assurance personnel can use source code analysis for determining the overall quality of the code, rather than merely, as is present practice, testing the system with a set of cases "from the outside". Quality assurance activities could use an appropriate source code analysis system to check conformance with programming standards as well as find system defects "in the large", that is, checking consistency across the system rather than just within a module. In particular, special-purpose reports can be formulated that generate relevant quality assurance metrics (e.g. the average number of callers of all functions not labelled "utility subroutines"), likely defect-producing constructs (e.g. all symbols that have more than one definition), large-scale system organization (e.g. module cross-reference charts) and other reports specific to the needs of quality assurance.

Since experienced practitioners of the art recognize the benefits of code examination a variety of tools have been utilized, whether appropriate or not. The most commonly used tool is the text editor. For example, in seeking where a particular symbol is referenced, programmers can use the "search" function found in all text editors to see a particular symbol of interest along with its source code context. Experienced practitioners recognize that this method is minimally useful.

More to the purpose at hand is a program named "grep" originally developed as part of the UNIX system. This program accepts a pattern (a string or a string with variable parts) and a list of file names. It searches the given files for lines containing the target string pattern and reports the file and line number of any lines containing the pattern. This program has the primary disadvantages of treating all source code as simple text therefore making searches that depend on the particular semantics involved impossible and of usually returning a too-large and useless result for short names that might occur within other strings. Further, patterns that eliminate possibilities of such useless results are complex or impossible to devise.

There are now several "cross-reference" systems available for various programming languages. These usually produce a listing of each symbol used and the location (source file name and line number) of the reference. These are somewhat more useful than the "grep" systems in that they have at least recognized symbols in the vocabulary of the particular programming language. However, their deficiencies include a static listing, no further knowledge of the semantics of the language, and sheer bulk of information produced. These deficiencies tend to make such systms generally unusable except for the smallest software system.

The first system designed for a similar purpose to the present invention was developed by Dr. Larry H. Masinter and described by him in "Global Program Analysis in an Interactive Environment", SSL-80-1, Jan. 1980, Xerox Palo Alto Research Center, Palo Alto, Calif. This system, named the Masterscope, was written in the Interlisp programming language and analyzed source code also in the Interlisp language. It also contained a special-purpose data store for the results of the analysis and a built-in query language (English-like) for users to query that data store. The data store was kept in main memory and consisted primarily of hash-coded access into lists of symbols mentioned in the analyzed code.

A research project at the University of Utah developed the Telescope system (see "Telescope: A Cross-Reference Utility for Lisp", Jed Krohnfeldt, December 1986, OpNote 86-11, Utah Portable Artificial Intelligence Support Systems Project, Computer Science Department, University of Utah, Salt Lake City, Utah 84112), one very similar to Masterscope. It also is coded in Lisp (albeit a different dialect), analyzes only Lisp source code contains its own special-purpose data store and its own special-purpose query language. It differs from the Masterscope primarily in the exploration of the use of a more complex, frame-and-object data store One commercial product in the general field is also available. Digital Equipment Corporation (DEC) is selling its "Source Code Analyzer" (SCA) system as part of its integrated system development tools package that runs on the DEC VAX family of computers. See "Guide to VAX Language-Sensitive Editor and VAX Source Code Analyzer", Digital Equipment Corporation, Maynard, Mass., order no. AI-FY24B-TK, August 1987. This system consists of (i) options on some of DEC's language compilers that causes the compilers to produce a special file with additional analysis information, (ii) a program to gather this information from several (or many) such files into a consolidated file and (iii) a special. purpose retrieval system that is integrated with checking consistency across the system rather than DEC's "Language-Sensitive Editor". The retrieval system has a limited set of possible queries and no means for additional queries.

The last three systems described (Masterscope, Microscope and SCA) differ from the previously mentioned systems in that the last three systems have capabilities that show they are intended for the specific purpose of examining source code and internal relationships therein. They provide code-specific queries, for example a tree of calls from one function or procedure to the ones called, and so on. They also provide some consistency checks across source file boundaries that their respective compilers and/or languages do not otherwise enforce.

However, none of the above described tools solve the general problem of extraction and accessibility of program-semantics information for the general software development community. These tools are (1) ignorant of purpose and so cannot extract certain kinds of information (e.g. they treat source code as text and are therefore unable to derive the symbols or the types of the symbols); (2) designed for special-purpose languages (e.g. Lisp); (3) integrated with special-purpose data stores; and/or (4) integrated with non-extendable special-purpose query systems.

SUMMARY OF THE INVENTION

The present invention introduces apparatus and a method for enabling the analysis of computer software source code and the extraction of program semantics information from that source code into a useful, accessible database form. In particular the present invention provides a system that places programming semantics information into independent databases with general and extensible query capabilities.

In a preferred embodiment of the present invention, a source code analysis system analyzes the interactions between attributes of source code symbols in an input program (i.e. subject source code) and analyzes the semantics of the operators applied to the symbols To accomplish this the system employs a lexical scanner, a parser and a semantics analyzer for extracting the programming semantics constructs of interest. The source code analysis system also employs a database interface component which provides for the placement of extracted semantics information into a desired preexisting or general purpose database.

Further, the source code analysis system utilizes a formal programming language grammar, which is tailored to the needs of an analysis system rather than other purposes, to generate the lexical scanner and parser components of the analysis system. As a result the source code analysis system extracts programming semantics information from a scanned and parsed source code that is specific to a subject programming language being analyzed, in order to faithfully capture the semantics of that language.

According to an aspect of the present invention, the source code analysis system isolates the language-understanding components from a data base management system which controls various desired databases, in order to easily accomodate many and diverse database systems. Therefore, the present invention provides an apparatus and method for analyzing source code modules to extract programming semantics information, for interfacing this information in a general way with database systems and for placing this information in a general-purpose database management system. This information is then accessible for manipulation and query by general-purpose query and report-generating systems or by special-purpose code-analysis-specific query and report systems.

In the preferred embodiment, a relational data base and structural query language are used. Other databases and query languages are suitable.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
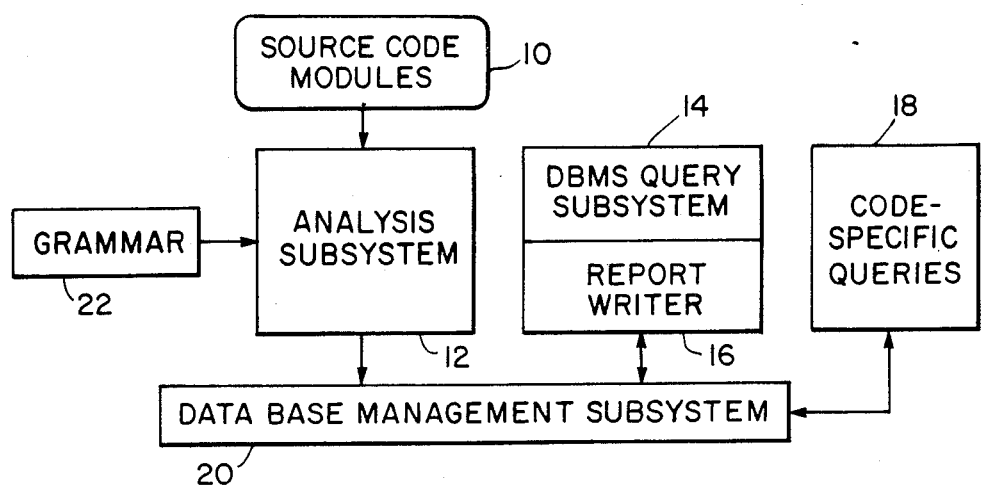
FIG. 1 is a block diagram of a source code analysis system embodying the present invention.

Referring to FIG. 1, a source analysis system according to the present invention is illustrated. The major components at the first level of description include an analysis subsystem 12, a database management subsystem 20, standard query and reporting subsystems 14, 16 and special-purpose query and reporting subsystems 18. The flow of information consists of a user's source code 10 being processed by the analysis subsystem 12, which extracts programming semantics information from that source code and places it into the database management subsystem's 20 data store. A grammar component 22 aids the analysis subsystem 12 by providing grammar constructs used in the source code 10. The user can subsequently access the stored information by use of either kind of query 14, 18 or report-generation subsystem 16, 18.

Figure 2:
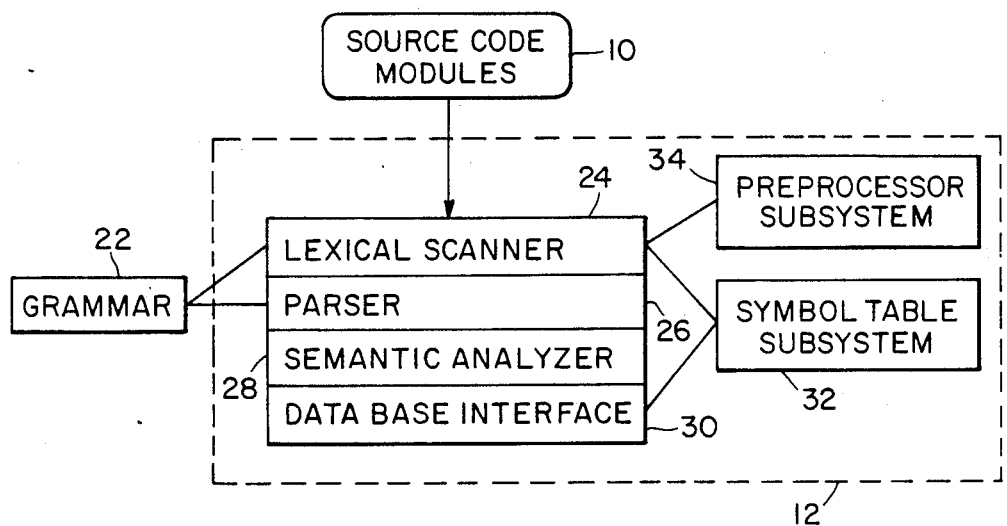
FIG. 2 is a more detailed illustration of the analysis subsystem of the system of FIG. 1.

FIG. 2 illustrates in more detail the analysis subsystem 12 shown in FIG. 1. The components of this subsystem 12 include a lexical scanner 24 that separates the source code file 10 into tokens appropriate to the target programming language, and a parser 26 for determining valid syntactic structure according to the target programming language. After determining valid syntactic structure of a token of the source code, the parser 26 calls a symantics analyzer 28 which extracts the programming semantics constructs of interest. A database interface 30 thereafter unifies the boundary between the analysis subsystem 12 and a variety of diverse database management systems such as 20 of FIG. 1, to enable user recall of the extracted inforamtion.

Coupled to the lexical scanner 24, parser 26, semantic analyzer 28 and database interface 30 is a symbol table subsystem 32. The symbol table subsystem 32 provides a dictionary of symbols found in the source code and defines name-spaces, proper scope and type of each symbol.

For source code in certain programming languages a preprocessor 34 coupled to the lexical scanner 24 provides language specific processing. For example, in the case where the source code is in "C" language, preprocessor 34 manages "macros", "include files" and "conditional constructs". Another example is the COPY and REPLACE statements in the Cobol-85 language.

Preferably the lexical scanner 24, parser 26, semantic analyzer 28, database interface 30, pre-processor 34 and symbol table subsystem 32 are of the type found in common compilers such as the Microsoft C Optimizing Compiler for the MS-DOS Operating System (User Guide and Reference Manuals), Microsoft Corporation, Redmont, Wash. However, in the present invention, the components are interconnected and operated for purposes of user analysis of an input source code program in a user-to-database environment, as opposed to processor compilation of the source code into machine readable language for computer execution of the program thereafter.

Examples of the kinds of semantics information extracted from the source code are contained in Table 1, though not limited to such examples. These include cross-reference information (i.e. where a symbol merely appears in the text of the source code), data and control flow information (i.e. dynamic properties of the execution behavior of the program), type information (i.e. descriptions of and relationships between semantic types) and filing information (i.e. source code information relative to the external operating system's imposition of file and directory structure). Note that Table 1 is an example of information relevant to the "C" programming language. This is for illustrative purposes only and a practitioner of the art can modify such examples to other programming languages.

Table 1. Kinds of Programming Semantics Information Extracted (Examples from the "C" programming language)

In each example below the type of extracted semantics information is described in a single line relationship. The meaning associated with the relationship is presented in following lines.

Mention (CONTEXT, SYMBOL, CLASS)
CONTEXT mentions SYMBOL as an element of type CLASS. CONTEXT can be either a source code file or a function. CLASS can be any one of FN, VAR, TYPEDEF, ENUMCONST, TAG, LABEL, MACRO or FIELD.

Declare (CONTEXT, OBJ, CLASS)
CONTEXT contains a binding declaration of the object OBJ of class CLASS.

CallForEffect (CONTEXT, FN)
A call to FN may occur under CONTEXT, but the return value of FN is ignored. This is the dynamic flow understanding of "call" and thus there is no general-computable means for establishing that the call will definitely occur, merely that it might.

CallForValue (CONTEXT, FN)
FN may be called by CONTEXT and if so the value returned by FN will be used.

Reference (CONTEXT, SYMBOL, CLASS)
The CONTEXT references somewhere the value of the SYMBOL. Class can be either VAR or ENUMCONST.

VariableSet (CONTEXT, VAR)
The CONTEXT sets somewhere the value of the variable VAR.

VariableModify (CONTEXT, VAR)
The CONTEXT modifies the value of the variable VAR. That is, VAR's value is a structure and the CONTEXT changes some component of it.

FieldFetch (CONTEXT, RECORD, FIELD)
The field FIELD of the record RECORD is accessed by the CONTEXT.

FieldReplace (CONTEXT, RECORD, FIELD)
The field FIELD of the record RECORD is assigned by the CONTEXT.

VarSetByAddress (CONTEXT)
CONTEXT contains a set of a variable given by address only. Thus it is not necessarily possible to tell which variable will be set by simple inspection of the static source code.

VarReferenceByAddress (CONTEXT)
CONTEXT accesses a variable given by address only.

NonLocalControl (CONTEXT)
CONTEXT calls a sub-function that is not expected to return in the normal subroutine fashion. Examples of such are "exit" and "long-jump".

CallByAddress (CONTEXT)
CONTEXT calls a function given by address only, i.e., a function determined at run time.

Define (FILE, SYMBOL, CLASS)
The FILE contains a defining declaration of the SYMBOL of class CLASS. CLASS can be either FN or VAR. This can be an object that is externally visible or only visible within one file.

Entry (FILE, SYMBOL, CLASS)
SYMBOL is declared to be an entry (i.e., non-static) object of class CLASS (either FN or VAR). Note that "external" means objects exported to the linker, so that this relation does not include any declarations of static objects or objects internal to a file or function.

MacroDefine (CONTEXT SYMBOL)
SYMBOL has been defined as a preprocessor macro within CONTEXT.

MacroUndefine (CONTEXT, SYMBOL)
SYMBOL was un-defined as a preprocessor macro.

MacroExpand (CONTEXT, SYMBOL)
SYMBOL, which has a preprocessor macro definition, was macro-expanded within CONTEXT.

FileAnalysis (FILE, FULLNAME, DATE)
FULLNAME is the fully-qualified name of file FILE, that was last modified on date DATE.

ReferenceAddress (CONTEXT, SYMBOL)
CONTEXT references the address of SYMBOL.

CastsTo (CONTEXT, TYPE)
Somewhere in CONTEXT is a cast to the type TYPE.

VariableArgumentStructure (FN, N)
The function FN expects at least N arguments plus some variable number of arguments more.

ArgumentType (FN, N, TYPE)
The function FN expects its Nth argument to be of type TYPE.

Returns (FN. TYPE)
The value of FN is of type TYPE.

The information actually stored in a data store of a desired database management subsystem and accessed includes the above as well as an indication as to the location (i.e., the source file, the line number and the column number) of every point that caused the semantics to be extracted. This additional location information enables accurate location and modification of desired parts of the source code.

Further information stored with each item includes the name of the file that was being analyzed when this particular item was extracted (the "basefile"). This is important in languages that allow source files to "include" other source files, that is, dynamically merge the source files into one logical source file. In analyzing a source file, the analysis subsystem 12 must first remove from the database any information extracted previously from this source file, and that includes information related to a secondary source file extracted during an analysis of the first. This prior removal is necessary for the reliability of the data in the database and the removal of the secondary information is critical in languages (such as "C") where the information extracted from the secondary files can vary depending on information preceeding them in the logical source file. The use of basefile information allows logically correct separation, addition and removal of information.

For purposes of illustration and not limitation, a more detailed description of a particular preferred embodiment follows and is organized by (1) the syntactic components of the analysis subsystem, (2) the management of symbol table information, (3) the extraction of semantics information, (4) the data base interface, (5) the data base management subsystem and (6) the query and report-generation subsystems.

SYNTACTIC ANALYSIS COMPONENTS

Figure 3:
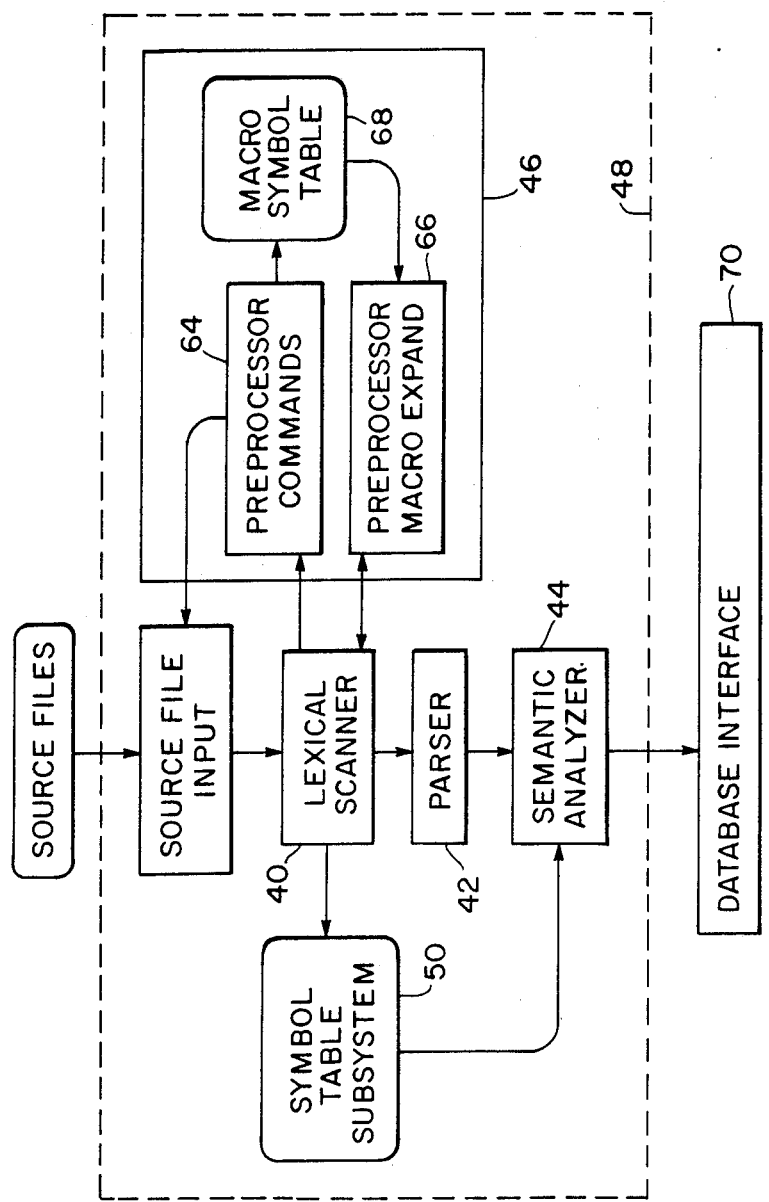
FIG. 3 is an illustration of the processing within syntactic analysis components of an analysis subsystem embodying the present invention.

FIG. 3 illustrates the overall structure of the analysis subsystem 48 of the preferred embodiment, including its symbol table 50 subsystem (and its preprocessor 46 subsystem that only occurs in certain programming languages such as "C" and COBOL).

Figure 4:
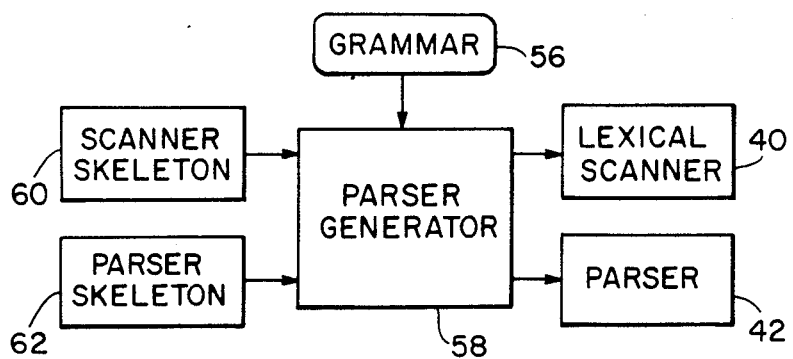
FIG. 4 is an illustration of the interaction of a formal grammar and parser-generator which create the lexical scanner and the parser of the embodiment of FIG. 3.

The components of the analysis subsystem 48, referred to as the syntactic analysis components, include a formal language grammar 56, a lexical scanner 40 and a parser 42 as shown in FIGS. 3 and 4. These components utilize the LALR(1) grammar formalism because of its known and reliable properties, but a practitioner of the art will recognize that other language formalisms are as applicable. As shown in FIG. 4, the lexical scanner 40 and the parser 42 are in fact generated by a LALR(1) parser generator 58. This program takes as input the formal grammar 56 of the target language, and a source code skeleton 60, 62 of each of the programs supporting the lexical scanner 40 and the parser 42. The generator 58 then produces the source code for a lexical scanner and a parser tailored to or customized for the particular target language described by the formal grammar 56. That is, the grammar 56 describes legal sentences in the target language and the parser 42 is generated to exactly analyze those sentences. The skeletons 60, 62 are generally program templates specialized to the source code analysis function. In this function, for example, the assumption is made that the source code being analyzed is syntactically and semantically correct. Therefore the amount of error checking built into the analysis subsystem 48, while still existent is minimal. This is in contrast to the opposite assumption built into a compiler, where error-checking and reporting are given high levels of attention.

The preferred embodiment of the parser 42 creates a data structure in memory that represents the parse tree of an input source code and details the interconnection of items in the source code. This parse tree is used by the semantics analyzer component 44 (FIG. 3) to extract semantic information. Also, during the construction of this parse tree, the semantics analyzer 44 component is called at appropriate points to search for symbols or to obtain definitions thereof through the symbol table subsystem 50.

The formal grammar 56 given as input to the LALR(1) generator 58 is also specialized by its purpose for source code analysis. The grammar can be made more efficient for this purpose by being more tolerant of syntactic categories than is normal in a grammar for the particular language. Again, the assumption that input to the analyzer is correct, along with the particular output of semantic analysis, allow a tailored grammar that can be both simpler and more efficient than a grammar being used by a compiler. One example of this effect for the "C" language is the processing of all "type-modifiers" identically, and in effect ignoring them. Such use of a formal grammar and grammar mechanism specifically for the purpose of source code analysis is novel in the art.

The lexical scanner 40 of the preferred embodiment separates the source code input into the tokens or "words" of the language and assigns each to a syntactic category. The program supporting the lexical scanner 40 is target-language specific and the LALR (1) generator 58 helps primarily by adding the code for handling "operators" (that is, single or multi-character symbols such as "=", "+=", etc.). Again, the specifics of source code analysis allow tailoring of the lexical scanner 40. For example, for most target languages the values of numeric or string constants (e.g. "1.234") can be ignored completely. For "C" in particular, these constants can sometimes be used by the preprocessor 46 and so they must be completely understood and remembered. Any user-defined symbols are extracted and saved in a symbol table of the symbol table subsystem 50, described below.

The "C" programming language also defines a preprocessor 46, which is a text-oriented macro language coexistent with "C". This preprocessor 46 is implemented as a separate program. In the preferred embodiment for the "C" target language, the preprocessor 46 is integrated with the lexical scanner 40 for efficiency. Thus the presence of preprocessor commands makes the lexical scanner 40 call a preprocessor command subprogram 64 to analyze the preprocessor line. The preprocessor command subprogram 64 contains a separate formal grammar of legal statements for use in certain expressions, and this is again processed by the LALR(1) generator 58. The preprocessor subsystem 46 keeps a separate macro symbol table 68, and the lexical scanner 40 checks the macro symbol table 68 whenever it scans a symbol. If the symbol has a macro definition that definition is processed by a preprocessor macro expand subprogram 66 at that time. For each scanned symbol, the preprocessor subprograms 64 and 66 replace the symbol by its definition and process that definition by passing the definition to the lexical scanner 40, directly or indirectly through the source file input. The preprocessor subsystem 46 also extracts semantics information as described below.

The lexical scanner 40 contains the code for reading source file lines from a file and keeping track of which file is currently being read and where within that file the reading is occuring. The preprocessor 46 integrates with this function of the lexical scanner 40 as well, both in acquiring input and also adding new source files to the stack of open input sources. Error messages printed during the analysis phase also refer to this information.

SYMBOL TABLE MANAGEMENT

Figure 5:
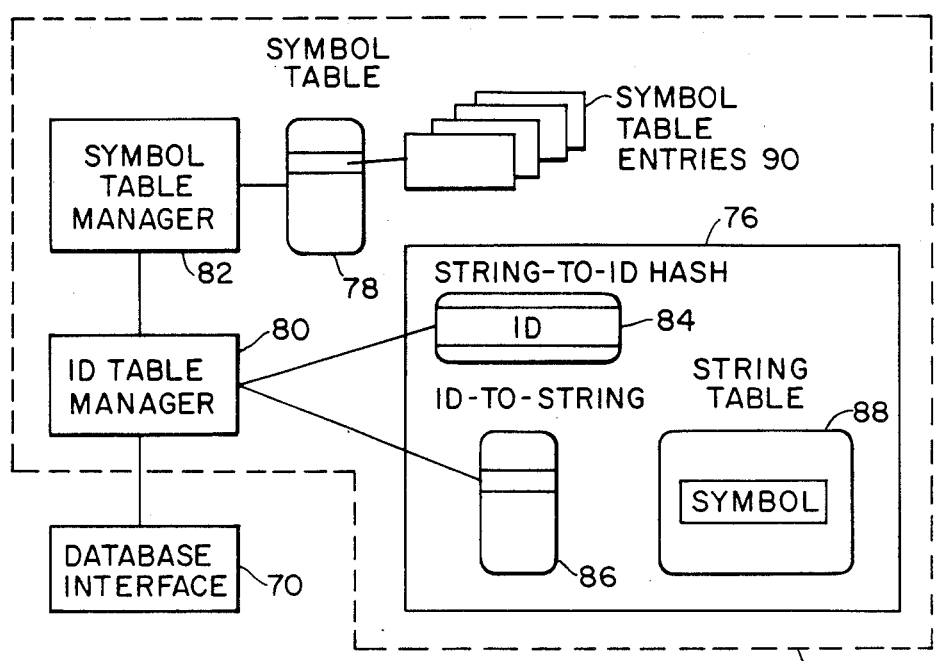
FIG. 5 is an illustration of a symbol table subsystem of the embodiment of FIG. 3.

The symbol table subsystem 50 has the purpose of saving and retrieving symbols and their relevant semantic properties, as well as interfacing to the database interface component 70 of the analysis subsystem 48. FIG. 5 illustrates the essentials of the symbol table subsystem 50. Due to the nature of the present invention, the symbol table subsystem 50 is constructed from two separate data structures, the id table 76 and the symbol table 78. For the "C" language implementation, there is another symbol table for preprocessor macros.

The id table 76 data structure is a set of elements, each of which contains a string and a database identification number, preferably a positive integer. An id table manager 80 efficiently accesses this structure 76 either through the string to get the identification number associated with a particular symbol or through the identification number to access the string associated with the particular identification number. All other components of the analysis subsystem 48 deal with identification numbers, rather than symbols. The preferred embodiment of the id table 76 contains three data structures: a hash table 84 wherein the string is the hash key and the identification number is the value held at that hash key, and an array 86 indexed by identification number whose elements contain an index into a string array 88. Starting at that index is the string of the desired symbol. This design allows efficient access in either direction without a large space overhead.

Any symbol found in any of the source code modules analyzed is associated with one and only one identification member, and that identification number is unique to that symbol. This id table 76 component is designed to allow encoding of the symbol names into small integers for efficiency in both space and time. For example, as will be described below, the database interface 70 uses identification numbers in order to compress transactions from at least 98 bytes to 12 bytes each. This use of identification numbers by the database subsystem is a way of taking advantage of the fact that for source code analysis the number of distinct symbols is much smaller than the number of facts that reference those symbols.

The process of acquiring a new identification number when a symbol is first encountered must therefore maintain the uniqueness of the association in the face of both previous symbols and the possibility of multiple simultaneous users doing independent analyses. In the present invention, the method utilized to associate an identification number with a given symbol involves the id table manager 80 first checking its internal id table 76 to see if that symbol is already known and has an identification number. If it finds the symbol, the identification number is returned. If the identification number is not found, the id table manager 80 utilizes the database interface component 70 to request an identification number for the given symbol. The database interface component 70 first checks its data store to see if the symbol is known to it and if so returns the associated identification number. If not, it allocates a new identification number and stores the association in its data store in a single database transaction. Thus the database interface 70 is responsible for coordinating multiple simultaneous users' needs for unique ids. This method has the advantages of supporting the uniqueness requirement as well as highly efficient normal operation, since all symbol lookups after the first encounter are to the local data structure and are accessible with a simple hash table probe.

The second major data structure of the symbol table subsystem 50 is the symbol table data store 78. The preferred embodiment of this structure 78 is an array indexed by the database identification number. This allows extremely efficient access to the data given an identification number, another reason for the encoding of symbols as identification numbers. The data contained in an array element is a stack of data structures, implemented as a linked list, each described as a symbol table entry 90. The stack of data structures 90 represents the programming language concept of lexical level and symbol scope. Within a symbol table entry 90 the data consists of the lexical level, the syntactic type of the symbol token numbers for use by the parser and preprocessor parser and some semantics information.

In the "C" programming language, for example, there are several distinct name spaces in which symbols can have independent meaning simultaneously (these have also been called "overloading classes"). Table 2 lists the name spaces for "C". The syntactic type field of the symbol table entry 90 indicates in which of these name spaces the symbol is currently defined. Since more than one is possible concurrently, the preferred embodiment of the syntactic type field consists of a bitfield with different bits assigned to different name spaces, along with a second field to distinguish the subcategories of "other". These subcategories are mutually exclusive. Practitioners of the art will recognize that similar concepts are applicable to other target programming languages.

Table 2. Name Spaces for the "C" Programming Language

Reserved Word *

Preprocessor Macro Name
Statement Label
Structure, Union and Enumeration Tag
Component Name
Other Name
   Variable
   Function
   Typedef Name
   Enumeration Constant The semantics information kept in the symbol table entry 90 are specific to the purposes of source code analysis. For the "C" target language this information consists of whether the symbol is an array of some object, is a pointer to something, is a function or a pointer to a function, and/or is an external or internal symbol. This kind of semantic information is too coarse and unrefined for a compiler, but is just the information needed to handle semantics extraction that requires some inference. For example, the statement "x=y" implies that the address of "y" is being referenced if and only if "y" has been declared to be an array or a function.

SEMANTICS EXTRACTION

Referring back to FIG. 3, the semantics component 44 is called by the parser 42 whenever a grammar rule has been processed. Most such calls merely build a semantics tree structure for later use, in a bottom-up fashion. Thus the expression "x+y" builds a data structure that represents a PLUS operator applied to the representation of "x" and the representation of "y".

Some calls to the semantics component 44 add information to the symbol table 78 to define new symbols, add to their properties or change the current lexical level when a lexical block is entered or exited.

However, at certain points it is desirable and possible to extract the semantics information. These points are at the full parsing of a declaration or definition of either a variable or a function. At these points, the semantics component 44 does a recursive walk down through the semantics tree that has been built bottom-up.

Figure 6:
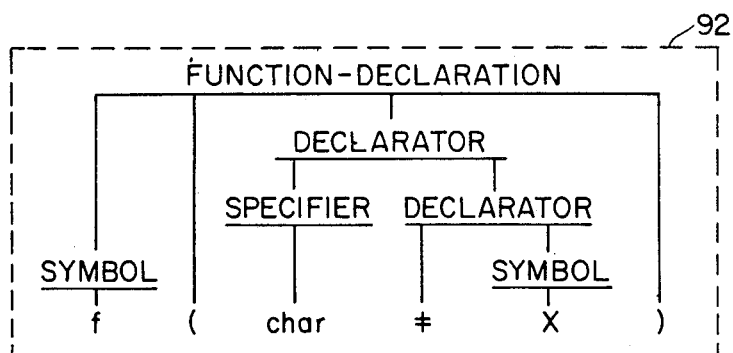
FIG. 6 is an illustration of a semantics tree and symbol-table processing associated with an example source code declaration in the embodiment of FIG. 3.
Figure 7:
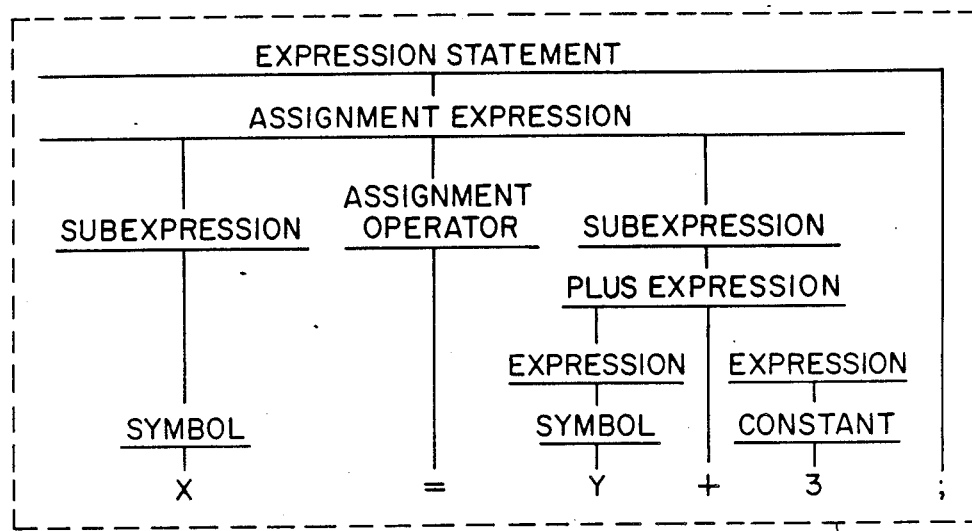
FIG. 7 is an illustration of semantics extraction processing associated with an example source code expression in the embodiment of FIG. 3.

This section will describe the method for processing declarations first as shown in FIG. 6, then the method for processing function and procedure definitions as shown in FIG. 7, and finally some miscellaneous topics.

The processing of declarations of symbols will depend on the target programming language involved. The following description will be specific to the "C" language, but experienced practitioners of the art will be able to see the applicability of the abstract method to other languages. Declarations in "C" consist of essentially three parts: a specifier giving some of the type information, a declarator giving further type information and the name to be declared, and finally an optional initializer expression. A complexity arises because the specifier can be shared among several declarators. For example, static int x=3, y[]={1,2,3}, z();

is a statement declaring x to be of type "static int" and having initial value 3; y is an array of 3 elements of type "static int" that have initial values 1, 2 and 3; and z is a function not externally visible ("static") and returning an integer.

Note that the specifier part of the declaration ("static int") is not necessarily contiguous with the declarator part (the phrase before the "="). Furthermore, the declaration must take effect as soon as the declarator part is parsed, since the initializer segment might reference the declaration. Therefore, the preferred embodiment of semantics extraction for the "C" language is that when specifiers are parsed their semantics tree is kept on a separate specifier stack. This is a stack since there might be embedded specifiers associated with inner declarations. The processing of a declarator, then, can access the top specifier on this stack, even though it is not strictly grammatically contiguous with the declarator.

Declarator processing consists of a top-down recursive walk of the semantics tree associated with both the top specifier and the declarator itself. A "context" is maintained that indicates which name space and symbol table semantics space the declaration's structure has determined. As an example of this processing, refer to FIG. 6. This figure shows part of the semantics tree 92 associated with the declaration int f(char *x);

which declares "f" to be a function having one argument and returning an integer. The argument name is "x" and its type is a pointer, as indicated by the asterisk, to a character. Upon seeing the function-declarator indicator at the top of the semantics tree 92, the context is set to "function" for the recursion to "f". The context is set to "variable" for the recursion on the parameter declarations down the left side of the tree 92. When the recursive walk reaches a symbol, the symbol is remembered in the symbol table 78 with the proper name space and semantics. Thus "f" is declared to be a function while "x" is declared to be a variable in the symbol table 78.

This top-down walk of declaration structures allows the full use of the parse context in interpretation of the declaration. It is not possible in a language such as "C", and most programming languages, to properly interpret declarations without such considerations.

The primary function of the semantics component 44 is the extraction of the semantics information. This is accomplished by another top-down walk of the semantics tree 92, whenever top-level declarations or definitions are reached. This process is accompanied with another "context" indicator, which provides one of the indications listed in Table 3. All statements and expressions in the grammar have a first associated routine that sets the proper context for lower-level processing. Each statement or expression in the language that has semantic meaning has a second associated routine that extracts that meaning.

Table 3. Semantics Extraction Contexts (for the "C" language)

value not used
value used
value set
value modified (i.e. component changed)
called as function (for effect only)
called as function (return value used)
address referenced
context for definition of data
context for definition of function
context for definition of field An example of this processing is illustrated in FIG. 7 for the statement "x =y +3;"

assuming x and y are integers. In a top-down walk of the semantics tree 94, the process first encounters the "expression statement" tag and sets the context to "value not used" since the value of the tag is not to be processed. The top-down walk next recurses to the next level of the tree 94. At "assignment expression" the process sets the context at "value not used". For the recursion on the first sub-expression (the "x") the process sets the context at "value set" because of the meaning of assignment. The processor sets the context of "value used" for the recursion on the second subexpression ("y +3"). At the semantics point "symbol x", the process, given the context "value set", emits the assertion "x is set". This assertion is a call to the database interface component 70, and is accompanied by the location of x in the source code which is recorded in the semantics tree. Similarly, the "symbol y" node causes the assertion "y's value used". No other assertions are made because all other nodes (i.e. "=", "+" and constant 3) have no semantics associated with them in this example and thus have no semantic information to be extracted.

Table 4 lists examples of context changes caused by particular grammar rules for the "C" language. Table 5 shows some examples of data base assertions associated with particular grammar rules. Both of these will be similar to those associated with semantic trees and grammar rules for other programming languages. Also, note that both kinds of processing happen simultaneously during the single top-down walk of the semantics tree.

The tables below provide only examples, not the complete set of assertions and context handling functions. However, a practitioner of the art will be able to complete the set for any given target programming language.

Table 4. Semantics Context Changes Associated with Semantics Tree (Examples from "C")

Each example will be a grammar rule followed by the context processing for each semantically. meaningful item in the right hand side of the rule. Even though the processing is really associated with semantic tags in a semantic tree structure, that structure mirrors the grammar rule examples below closely, and greater understanding of the process is obtained by direct correlation with an understandable grammar rule.

Assign-Exp->Cond-Exp Asgn-Op Exp
  for Cond-Exp, context is old context with:
    "call" off
    "value used" on only if asgn-op is not "="
    "value set" on
  for Exp, context is old context with "value used" on.
While-Stmt->while (Exp) Stmt
  for Exp, context is old context with "value used" on
  for Stmt, context is old context with "value used" off.
Prefix-Exp->*Cast-Exp
  for Cast-Exp, context is old context with:
    "call for effect" and "call for value" off
    "value set" and "value modified" off
    "address referenced" off
    "value used" on.
Primary-P2-Exp->Primary-P2-Exp [Exp]
  if old context has "call" on, recurse on Primary-P2-Exp with both types of "call" off; recurse on Exp with "value used" on and "call" off
  if old context has "value set" on, recurse on Primary-P2-Exp with "value set" off and "value modified" on; recurse on Exp with "value set" off, "value used" on.
  if old context has "address referenced" on, recurse on Primary-P2-Exp with same context; recurse on Exp with "address referenced" off, "value used" on.
  otherwise, recurse on Primary-P2-Exp with old context; recurse on Exp with "value used" on.
Function-Dcltr->Dcltr (Formals-Declaration)
  for Dcltr, context is the old context. This assumes we have set up the proper define context, if appropriate, earlier in the tree walk.
  for Formals-Declaration, context is the old context with "define data", define function", "value set" and "value modified" turned off.

Table 5. Assertions Associated with Semantics Tree (Examples from "C")

Assign-Exp->Cond-Exp Asgn-Op Exp
  if the context is "call" and the Asgn-Op is not "=", assert "call by address". This is a case of computing the function to be called.
Field-Name-> <identifier>
  if the context is "value used", assert "fetch field".
  if the context is "value set", assert "replace field".
Name-Dcltr-> <identifier>
  Assert "declare" of this identifier with the type found in the current symbol table entry.
  if this symbol is not a typedef name and it is an internal symbol and (we are in a data define context and the symbol does not represent a function) or (we are in a function define and the symbol does represent a function), then assert "define".
  if this is an external symbol, assert "entry".
  if the context is "value set" and the symbol represents a variable, then assert "variable set".
Symbol-> <identifier<
  if the identifier represents a variable:
    if the context is "value used" and the identifier represents an array, assert "reference address".
    if the context is "value used" and the identifier represents a simple variable, assert "reference".
    if the context is "value set", assert "variable set".
    if the context is "value modified", assert "variable modify".
    if the context is "address referenced", assert "reference address".
  if the identifier represents a function:
    if the context is not "call", assert "reference address".
    if the context is "call" and the identifier is one of the known non-local sub-functions, assert "non-local control".
    otherwise assert "call for value" or "call for effect" depending on the particular context.
  if the identifier represents a pointer to a function: assert "call by address".
Prefix-Exp->*Cast-Exp
  if the context is "value used", assert "variable reference by address".
  if the context is "call", assert "call by address".
  if the context is "value set", assert "variable set by address".

For the "C" language, the preprocessor 46 also extracts some semantics information. This information is queued for later assertion as explained below. The semantics of the preprocessor 46 involve "Macro Define", "Macro Undefine", "Macro Expand" and "Include File".

As described in the previous section and in Table 1, semantic assertions involve not only the relationship and the location of the occurance but also a context. Thus, for example, a variable is usually declared within a function, but might be declared at the top level of a file. The semantics extraction component 44, therefore keeps track of the current-defining-context. This is either the current source file identification or, if the analysis is within the definition of a particular function, the function's identification. This current-defining-context is used in all assertions.

The "C" preprocessor, on the other hand, operates logically prior to parsing and semantic analysis. Without further mechanism all assertions from the preprocessor would be independent of context other than the base source file. In fact this is logically true, but is not the full use of available information. The preferred embodiment of the invention therefore queues all assertions from the preprocessor 46, and processes this queue whenever the current-defining-context or the current source file is about to change. This provides the correct context which is embedded into the assertions. This mechanism for extracting the correct defining-context depends on the integral embodiment of the preprocessor 46.

The Database Interface

Figure 8:
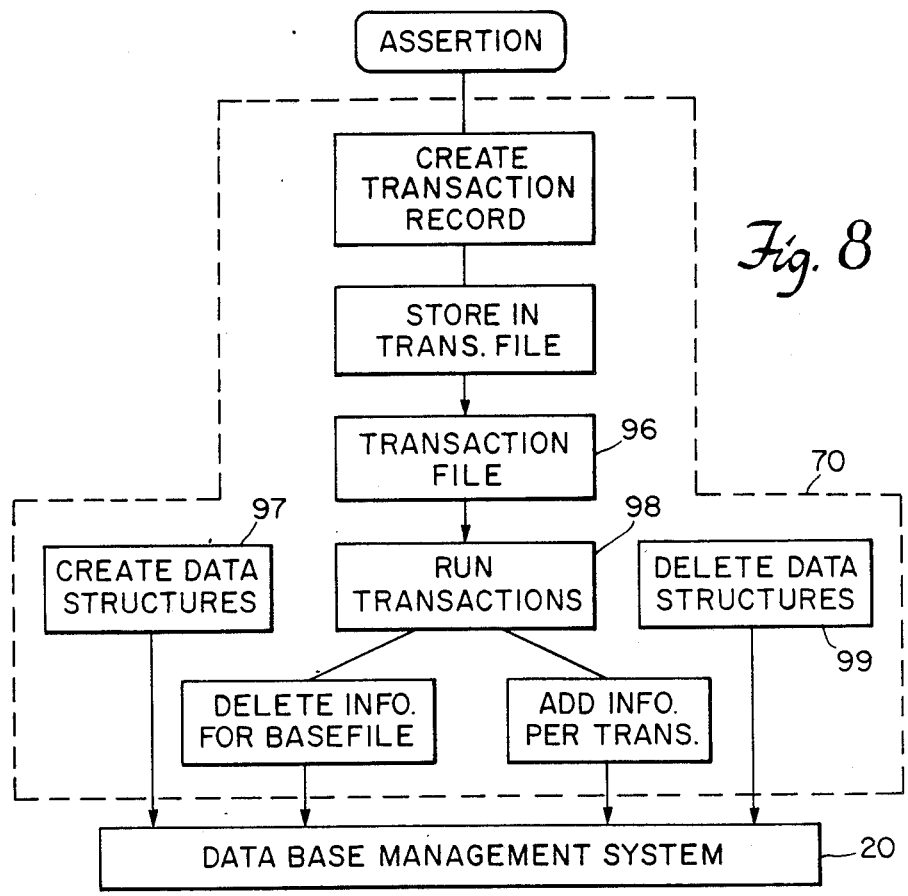
FIG. 8 is a block diagram of the database interface component in the embodiment of FIG. 3.

The database interface component 70 is designed to isolate the entire analysis process from the particular database management system used as well as prevent any database changes from being made until all the analysis completes successfully. FIG. 8 illustrates the operation of the database interface component 70.

All assertions sent to the database interface component are first turned into a compressed data record. Table 6 described the preferred embodiment of this record. These records are kept in a temporary transaction file 96 while the analysis process is executing. The preferred embodiment may also include a similar record structure and another transaction file for variable length data. An example would be the full text of a function definition header, if that information is to be extracted for the database.

Table 6. Transaction Data Record Fields

TABLE 6

| Transaction Data Record Fields | |
|---|---|
| Field Content | Length |
| relation code | 1 byte |
| data class code | 1 byte |
| context id | 2 bytes |
| object id | 2 bytes |
| source file id | 2 bytes |
| line number | 2 bytes |
| column number | 2 bytes |
| total space used | 12 bytes |

All fields represent unsigned integers.

The "relation code" is a numeric code for the particular relation embodied, one for each relation shown in Table 1.

The "class code" is a numeric code for data types such as variable, function, etc. mentioned in Table 1 as CLASS.

The id fields are database identification numbers as described in the Symbol Table description above.

As shown in FIG. 8, at the end of the analysis process, and assuming that the analysis completed successfully, the transaction file 96 is then processed by the "run transactions" sub-component 98. This subcomponent 98 first deletes all data associated with the particular "basefile" that was just analyzed. Then each data record is interpreted into a proper call for the database management system 70 utilized. Table 7 provides examples of the database interface calls for an embedded Structured Query Language (SQL) database system. Other interface implementations will be obvious to an experienced practitioner of the art.

Table 7. Example Code for an embedded SQL Database Interface

The examples below all assume that the data has been stored in a single base table ("base") that has been declared:
EXEC SQL CREATE TABLE base (
  relation number(2),
  sourcefile char(31),
  line number(4),
  col number(3),
  context char(31),
  object char(31),
  class char(8),
  basefile char(31) NOT NULL);

Note that with the above assumption we would also have declarations of "views" for each user-level table such as those in Table 1. For
EXEC SQL CREATE VIEW mention AS SELECT
  (context, object, class, sourcefile, line, col)
  FROM base
  WHERE rel=1;

Example 1. Delete all data associated with a particular basefile. Assume the identification of the basefile is in the host language variable "base":
EXEC SQL DELETE FROM base
  WHERE basefile =:base;

Example 2. Add information from a data record to the database. Assume the record is in the "C" language record "rec" and the fields are named consistently with the items in Table 6. "id$_{13}$to$_{13}$symbol" is a "C" function that converts a database identification into a character string.
rel=rec.rel;
source=id$_{13}$ to __symbol(rec.sourcefile);
line=rec.line.,
col=rec.col;
context=id__to__symbol(rec.context);
object=id__to__symbol(rec.object);
class=id__to__symbol(rec.class);
EXEC SQL INSERT INTO base
  VALUES (:rel, :source, :line, :col, :context, :object, :class, :base);

The database interface component 70 can be designed to put all data into a single database table or into one table for each relation. It can also store the complete character strings or instead store the database identification numbers and a symbol table analogue in the database. Such design decisions have effects on store and retrieval performance and space usage. The magnitude of these effects depends on the particular data base management system 20 utilized. Any combination of such design decisions is easily implemented because of the isolation provided by the database interface protocol.

There are also ancillary sub-components 97, 99 for the creation and deletion of the database files or tables shown in FIG. 8. In the preferred embodiment, these are implemented as separate programs. The "create" program 97 informs the database management system 20 of the type of data to be stored and requests the system 20 to reserve pertinent space for the data. The delete program 99 tells the database management system when data no longer needs to be saved and the space holding the data no longer needs to be reserved.

Database Management System

The database interface component 70 of the analysis subsystem 48 has isolated the analysis information to the point where virtually any database management system can be employed. Various embodiments of the present invention utilize a simple in-memory system, a simple ISAM (Indexed Sequential Access Method) file management system (CTREE Programmer's Guide. Fourth Edition, FairCom, Columbia, Mo., April 1988) or one of the most advanced relational database management systems (ORACLE reference manuals). The amount of effort and time needed to incorporate a new database management system is on the order of one person working-one week or less with changes in the interface component 70 ranging from no changes in going from one SQL database system to another, to rewriting the components Create Data Structures 97 and Delete Data Structures 99 and changing the database subroutine calls for deleting and adding information within Run Transactions 98.

The choice of database system employed is influenced by market needs and functional emphasis. For use by programmers in developmental stages the emphasis is on fast analysis performance and simple, ad hoc queries. If the use is by analysts and quality assurance personnel, the emphasis is on comprehensive reporting, with standardized reports that can be quite complex. Both types of uses, as well as others, are easily accomodated by existing database systems coupled to the analysis subsystem 48 of the present invention through the database interface component 70.

The independence of the database management system, the use of standard generalized database management systems and the use of full relational database management systems are novel in the art for the purposes of source code analysis. The last is particularly important, since SQL is quite powerful and is becoming the standard interface language to relational database management systems. SQL as a user interface allows both standardized query systems and programmatic query systems to be created.

Query and Report-Generation Components

The output components are similarly independent of the rest of the implementation, and depend primarily on the particular database management system selected. Special-purpose query and report components can be created to match special database management components (such as for use by programmers), or the system might incorporate more general purpose query components matching the more general-purpose database systems..

In particular, if the database system incorporates an SQL user interface, there are a variety of query and reporting systems available or under development that will interact with it. These range from direct interaction with SQL language to screen-forms to query-by-example systems known in the art. These query and reporting systems are making it easier to specify what data is desired by a user and how to present it, and thus making the information contained in the database more accessible.

SQL also allows other data tables and other databases to be created easily from the base data, making that base data more accessible for specialized information purposes. Complex reports based on the manipulation of source code analysis information are valuable for higher-level understanding of the underlying global structure of that source code. The accessibility of source code analysis information by SQL and in a general-purpose relational database is unique to the present invention.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. In a computer system, apparatus for analyzing source code comprising:
   an analysis member which extracts programming semantics information from an input source code of a user desired program;
   data storage memory supported independently of the analysis member for receiving from the analysis member extracted programming semantics information and for holding said extracted programming semantics information; and
   query means enabling a user to request and obtain desired information about the input source code from the data storage memory, the user analyzing the source code from the obtained information.

2. Apparatus as claimed in claim 1 wherein the analysis member includes:
   a lexical scanner for separating the source code into tokens according to programming language of the source code;
   a parser coupled to the lexical scanner for determining valid syntactic structure according to the programming language of the source code;
   semantic analyzing means called by the parser for extracting programming semantics constructs from the input source code; and
   a database interface for passing extracted programming semantics information to the data storage member in a format acceptable by support means which support the data storage memory.

3. Apparatus as claimed in claim 2 further comprising a formal grammar mechanism coupled to the lexical scanner and parser for customizing processing of source code to a particular programming language defined by the formal grammar mechanism.

4. Apparatus as claimed in claim 1 wherein the data storage memory is supported by a relational database management system.

5. Apparatus as claimed in claim 1 wherein the query means includes a structured query language.

6. In a computer system, apparatus for analyzing source code comprising:

a lexical scanner for separating an input source code of a user chosen program, the lexical scanner separating the source code into tokens according to programming language of the source code;

a parser for receiving the tokens from the lexical scanner and determining valid syntactic structure of the tokens;

semantic analyzing means responsive to the parser for extracting programming semantics constructs from the input source code and therewith generating a multiplicity of programming semantics information of the input source code; and interface means for receiving the programming semantics information from the semantic analyzing means and formatting the programming semantics information such that the programming semantics information is accessible through a user desired database.

7. Apparatus as claimed in claim 6 further comprising a formal grammar mechanism coupled to the lexical scanner and parser for customizing processing of source code to a particular programming language defined by the formal grammar mechanism.

8. Apparatus as claimed in claim 6 wherein the interface means formats the programming semantics information for access through a relational database which is supported by independent management means.

9. Apparatus as claimed in claim 6 further comprising query means enabling a user to obtain desired programming semantics information from the user desired database.

10. Apparatus as claimed in claim 9 wherein the query means include a structured query language.

11. In a computer system, apparatus for analyzing source code comprising:

a general purpose relational database which is accessible by various tasks and supported by independent management means;

an analysis member for extracting programming semantics information from an input source code of a subject program;

a database interface component coupled to the analysis member for formatting and placing the extracted programming semantics information into the general purpose relational database; and a structured query language for accessing user desired programming semantics information from the database upon user command, a user being able to analyze the source code from the accessed information.

12. In a computer system, a method of analyzing source code, the steps comprising:

providing apparatus for extracting programming semantics information from an input source code of a user desired program;

formatting the extracted information for storage in a preexisting database supported by independent management means;

storing the formatted information in the database; and requesting and obtaining desired programming semantics information from the database using query means.

13. A method of analyzing source code as claimed in claim 12 wherein the step of providing apparatus includes providing:

a lexical scanner for separating the source code into tokens according to programming language of the source code;

a parser coupled to the lexical scanner for determining valid syntactic structure; and semantic analyzing means called by the parser for extracting programming semantics constructs from the input source code.

14. A method of analyzing source code as claimed in claim 13 wherein the step of providing apparatus further includes providing a formal grammar mechanism coupled to the lexical scanner and parser for customizing processing of source code to a particular programming language defined by the formal grammar mechanism.

15. A method of analyzing source code as claimed in claim 12 wherein the preexisting database is a relational database; and further comprising a relational database management system for supporting the relational database.

16. A method of analyzing source code as claimed in claim 12 wherein the step of requesting and obtaining using query means includes employing a structured query language.

17. A method of analyzing source code as claimed in claim 12 wherein the step of storing the formatted information includes isolating the extracted information which is to be formatted from the management means of the database.

18. In a computer system, a method of providing information about a user selected source code for user analysis of the source code, the steps comprising:

extracting programming semantics information from each file of an input source code, the step of extracting including for each file, isolating the extracted information of the file from the extracted infromation of the other files;

formatting the extracted information for storage in and access through a user desired database system; and through a query system coupled to the database system, providing desired programming semantics information from the database upon user request.

19. A method as claimed in claim 18 wherein the step of extracting includes:

building a semantics tree structure for representing each expression in the source code, each element of an expression being represented by a node of the tree structure the nodes being ordered according to the expression and location of each element in the source code being indicated in the tree structure;

assigning each node a context as a function of use in the source code of the element represented by the respective node;

traversing the tree structure from node to node in order according to the expressions represented by the nodes, and at each node, asserting to an interface component (i) relationship of the respective element, (ii) location in the source code of the element and (iii) context assigned to the node; and the interface component performing the step of formatting the extracted information.

* * * * *

UNITED STATES PATENT AND TRADEMARK OFFICE
CERTIFICATE OF CORRECTION

PATENT NO. : 4,931,928

DATED : June 5, 1990

INVENTOR(S) : Norton R. Greenfeld

It is certified that error appears in the above-identified patent and that said Letters Patent is hereby corrected as shown below:

Column 18, line 55:
    Claim 2, line 14, delete "member" and insert instead ---memory---.

Signed and Sealed this

Twentieth Day of August, 1991

*Attest:*

HARRY F. MANBECK, JR.

*Attesting Officer*      *Commissioner of Patents and Trademarks*